Feb. 7, 1928.

L. HAMMOND 1,658,439

STEREOSCOPIC PICTURE VIEWING APPARATUS

Filed Nov. 18, 1922

Inventor
LAURENS HAMMOND
By Ralyemond A. Parker
Attorney

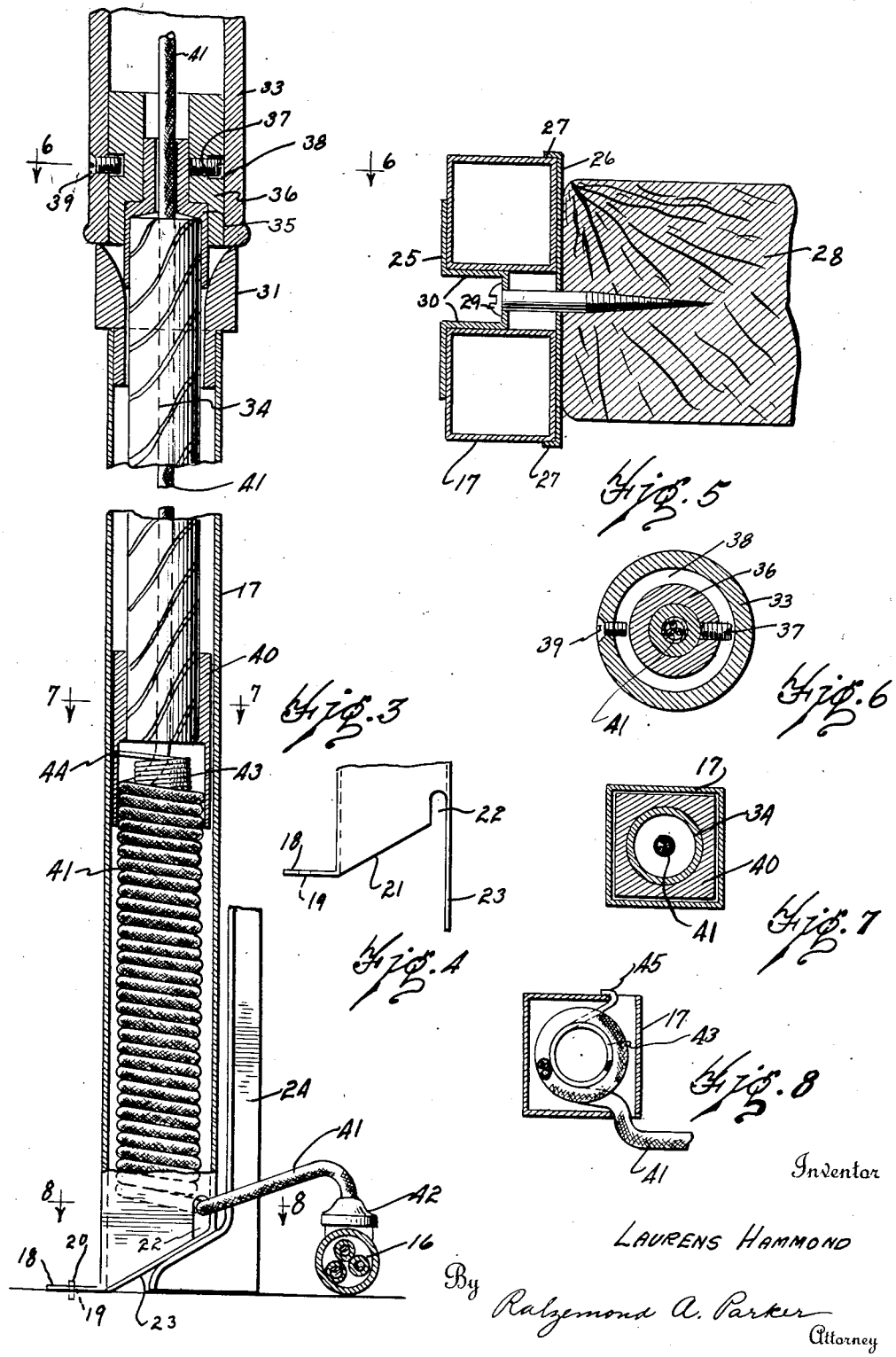

Patented Feb. 7, 1928.

1,658,439

UNITED STATES PATENT OFFICE.

LAURENS HAMMOND, OF NEW YORK, N. Y.

STEREOSCOPIC-PICTURE-VIEWING APPARATUS.

Application filed November 18, 1922. Serial No. 601,723.

This invention relates to the construction and disposition of an equipment in a theatre through the use of which pictures may be exhibited to a large number of people with resulting stereoscopic effect. This invention does not pertain to the method by which the pictures are projected to bring about stereoscopic result but rather to the disposition of the equipment in the theatre necessary for the use of the spectators in order that the pictures may appear in stereoscopic relief. The process and apparatus for projecting the pictures to produce stereoscopic result is described in my Patent 1,435,520 and an improved form of optical instrument is described in my patent application Serial No. 519,334.

It is well known that all processes of picture projection producing stereoscopic effect require an individual optical instrument for the use of each spectator in looking at such pictures. Many such processes have been invented and tried but have not come into commercial use on account of the objection which it is thought would be felt by the public to the use of an individual instrument for looking at pictures in a theatre, which instrument of necessity would be used successively by a very great number of persons. In the processes heretofore invented, with which I am familiar, it has always been proposed to provide each spectator with an instrument in the form of eye-glasses or an instrument resembling binoculars which such spectator must wear on the nose or hold in the hands to look at the projected pictures. For example, spectators have been supplied with red and green glasses to be worn on the face, or with electrically-operated spectacles or with some electrically-operated optical device to be held in the hand. For sanitary and other reasons it was felt that spectacles would not be welcomed by the public nor would the average theatre goer be willing to hold any kind of instrument to look at pictures throughout an ordinary entertainment. Moreover, any such device would necessarily have to be made exceedingly light in construction and would, therefore, be very fragile and easily broken.

With the arrangement and construction of equipment which I propose to employ it will be possible to provide each spectator with a heavy, substantial, not easily broken instrument which it will not be necessary to place on the nose or hold in the hands. With this construction and arrangement of equipment which I claim as my invention, it is planned to permanently equip a theatre with an electrically-operated individual optical instrument to be associated with each seat structure for the use of the occupant of the seat. This instrument is so supported that when not desired for use it may be completely removed from interference in any way with the movement of the spectators when entering or leaving the theatre and is in a protected position so as not to be easily broken or injured. It is so associated with the seat as to be capable of movement to any position for the use of the observer occupying the seat so as to be on a line between the eyes of the observer and the projected pictures on the screen. This is true notwithstanding the position which the observer may assume in the seat and the instrument be supported stationary at any such position to which moved without any assistance from the observer and will not obstruct the sight of any observer in the rear. The connection with the seat is such that the unauthorized removal of the instrument will be difficult. Furthermore, the construction and arrangement of the equipment is such as not to violate any of the local rules of the fire department, department of public health and safety, and insurance underwriters.

The optical instrument which is actually used to look through is described in my copending application No. 519,334, and consists essentially of a housing containing a rotary interrupting shutter and electric motor to drive the same. The housing has a window, front and back, through which an observer may look at the screen. This housing I propose to make of substantial construction without regard to its weight and to mount the whole on a bracket of suitable design which will be rigidly fastened to the seat by means which it is ordinarily impossible for a spectator to unfasten. The details of this supporting member will hereinafter be described, however. I do not wish to limit the construction of the supporting member of this instrument to the exact type as herein shown but use this construction merely to illustrate how a substantial and yet convenient support may be made to hold a heavy instrument of this type, believing that the spirit of the invention lies in the general disposition of the viewing apparatus in the theatre with regard to the spectator's seat rather than in the particular form of support used.

Further objects together with particular meritorious features of construction and assembly will appear from the following description, appended claims and accompanying drawing, in which:

Fig. 3 is a longitudinal sectional view through a portion of the support for the optical instrument.

Fig. 4 is a fragmentary elevation of the lower end of the tubular standard.

Fig. 5 is a horizontal sectional view showing means for securing the standard to a chair.

Fig. 6 is a sectional view taken on the line 6—6 of Fig. 3.

Fig. 7 is a sectional view taken on the line 7—7 of Fig. 3.

Fig. 8 is a sectional view taken on the line 8—8 of Fig. 3.

Figure 1:
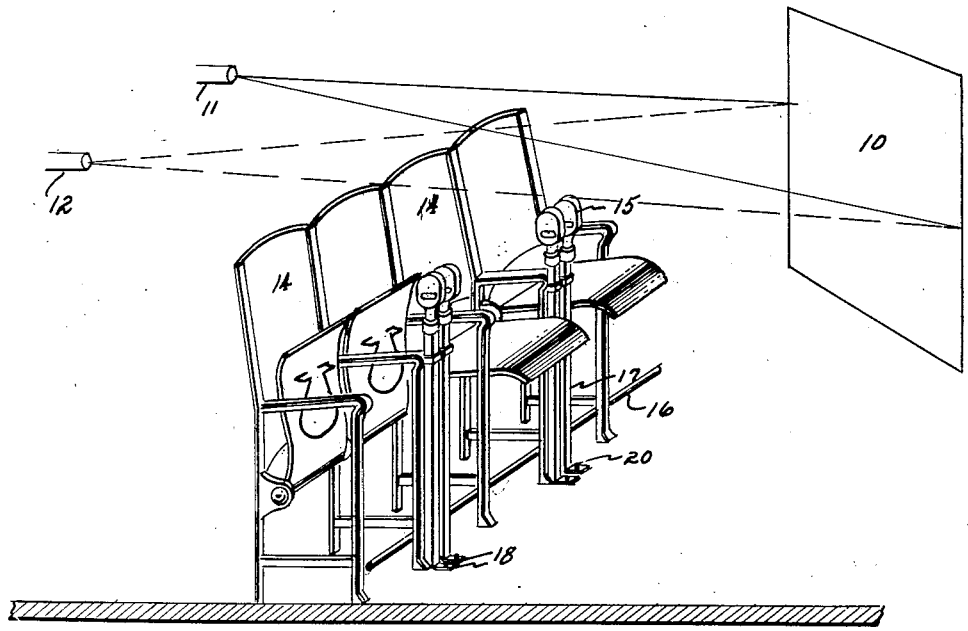
Figure 1 is a perspective showing the screen, projectors, and a row of theatre chairs.

In the drawings, Fig. 1 represents a diagrammatic view through a theatre showing the screen 10, projectors 11 and 12 for projecting right and left eye views of each picture to be viewed, which right and left eye views are projected alternately in succession throughout the movement series, as described in my co-pending application first above mentioned. An incomplete row of theatre chairs 14 is shown. Each chair is equipped with an optical instrument for the use of the observer occupying the chair. These several optical instruments are driven from a suitable source of electrical energy, the current being conducted to the motors of the individual instruments through feeder wires, one of which wires is indicated as 16 and is shown as extending along the row of seats. This feeder wire is provided at convenient places with contacts which are here shown as positioned one near each seat at alternate intervals between the seats. Each optical instrument is provided with an electrical connection adapted for detachable, interchangeable engagement with the contact on the feeder wire so that the motor of the instrument may be driven by a current from said wire.

The optical instrument is supported in association with a theatre chair by means of a supporting mechanism comprising a stationary portion which is so disposed relative the chair as not to interfere with the movement of the chair seat or the entrance or departure of the spectator from the chair or the movement of other spectators through the aisles or through the successive rows of chairs; and a movable portion which is in the form of a supporting arm connected with the stationary portion to be withdrawn outwardly therefrom and disposed at a position angularly thereto and when so disposed capable of supporting the optical instrument stationary for use as desired.

The stationary portion comprises, as here shown, a tubular standard 17 which is rectangular in cross section and formed at the lower end with an outwardly projecting lip 18 perforated at 19 to be freely removably received over a lug or pin 20 positioned in the floor just forwardly of the chair leg 24. The standard is cut away on each side rearwardly of this lip as at 21 and formed with an upwardly-extending slot 22 adjacent the rear wall thereof through which slot extends an electrical connection leading from the feeder wire 16 to the motor of the optical instrument. The rear wall of the standard is extended as at 23 and adapted to be turned over to close the open end of the standard, as appears in Fig. 3.

The standards are further secured in the upright position to the theatre chair by means of a strap 25 which is adapted to engage the face of a pair of standards and is bent inwardly intermediate its ends as at 30 between said standards as appears in Fig. 4, to hold the standards in the pair in spaced apart relationship. A back plate 26 is provided which is turned over at the ends to engage opposite sides of the pair of standards and this strap and back plate are secured to the chair arm 28 by means of a screw 29. It will be seen that the back plate and strap are adjustable lengthwise the standards so as to permit of securing the standards to the arm of a theatre chair irrespective of the height the arm may be from the floor of the theatre.

This standard is closed at the upper end by means of a cap 31 which is formed with a shoulder 32 overlapping the end of the standard. The cap extends downwardly within the standard as appears in Fig. 3 and is secured rigidly thereto in any desired manner. This cap may preferably be made of hard rubber and the end of the handle or hand grip of the optical instrument 33 rests thereon when the instrument is not in use.

The movable supporting arm for the optical instrument is indicated as 34 and is formed of wound metal goose-neck tubing. It is receivable within the hollow supporting standard 17 but is capable of withdrawal therefrom, and of being flexed to any position desired, and when disposed at a position angularly said standard is capable of supporting the weight of the optical instrument at any position to which the same may be moved so as to bring the instrument between the spectator and the screen. The instrument itself is swiveled to the upper end of this movable arm.

An end piece 35 is secured to the upper end of this arm and there is fixed to this end piece a bearing 36 held thereto by means of a set screw or pin 37 which projects outwardly into a channel 38 formed in said bearing. The hand grip 33 carries a set screw 39 which extends therethrough to travel in this channel 38 as the optical instrument is rotated upon the bearing until its travel is arrested by the pin 37. The limit of rotation of the optical instrument upon the arm is, therefore, slightly less than 360 degrees. This prevents twisting of the electrical connection which extends from the instrument to the feeder wire.

Mounted upon the lower end of this movable arm 34 is a block 40 shaped to correspond with the interior of the standard 17 within which the same is disposed so as to prevent rotation of the arm within the standard while permitting free slidable travel of the arm therethrough. This block also limits the outward travel of the arm as the block is engaged by the interiorly projecting shoulder of the cap 32 to prevent complete withdrawal of the arm from the standard.

Extending from the motor of the optical instrument through the arm 34 is an electric wire 41 which is disposed in successive coils in the lower part of the standard 17 below the lower end of the arm 34. This wire extends out through the aperture 22 in the standard and is provided at the outer end with a connection 42 adapted for detachable engagement with any contact on the feeder wire 16.

To support this electric wire in the standard and preventing kinking thereof, I provide a flexible supporting core upon which the wire is wound, which core consists of a spiral spring 43 connected at one end as at 44 within the recessed end of the block 40. The end of the spring is secured within this recess, as shown in Fig. 3, and at the opposite end the spring is fastened to the upright standard 17, as shown at 45. Preferably the conducting wire is coiled about the spring reversely the winding of the spring so as not to become engaged between the successive coils of the spring. This spring serves as a flexible core which at all times supports the electric wire and preserves it in shape for extension and contraction within the tubular standard without doubling over upon itself and kinking. The spring is not intended for the purpose of retracting the movable arm 34 though it would of necessity exert a slight restraint upon its withdrawal from the standard.

Figure 2:
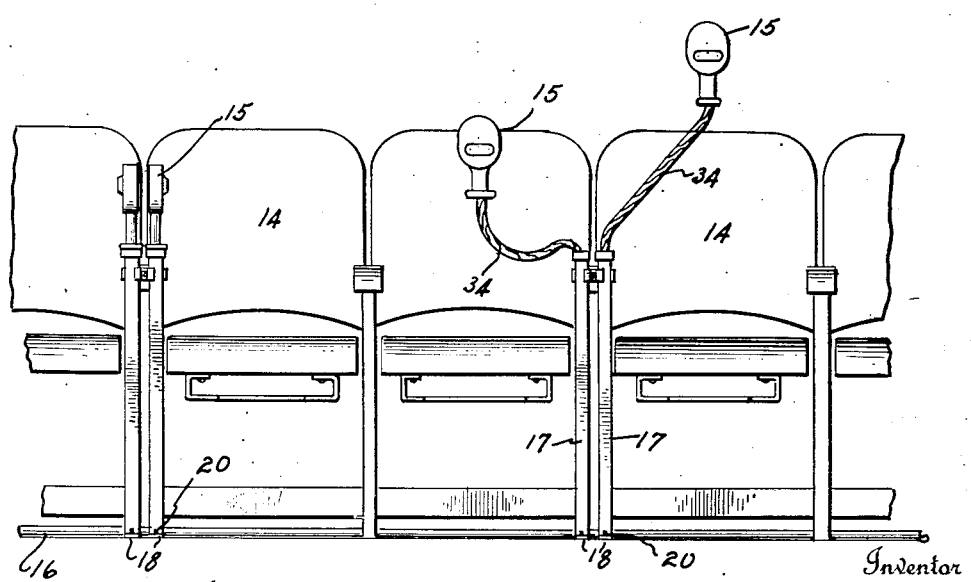
Fig. 2 is a front fragmentary elevation of a plurality of theatre chairs equipped with my improved device.

When the two instruments in a single pair are at rest each instrument may be rotated half a turn so that the two instruments in a pair may face each other, as shown in Figs. 1 and 2. In this position they occupy a small space and by virtue of the position of the standards in pairs the seats are available for occupancy in blocks of two without any obstruction between the seats in such a block.

Each instrument may be withdrawn as desired for use, the movable arm traveling outwardly from the standard within the limit of its movement. An instrument may be moved to any position desired to place the same between the observer occupying the chair and the screen on which the pictures are projected so that an observer may look through the instrument at the projected pictures. The character of the supporting arm permits the positioning of the instrument at any desired place within the range of its movement and the instrument will remain stationary in such position for use. The arm may be withdrawn outwardly on a line with the tubular standard and then moved to a position angularly the standard at which position it will support the weight of the optical instrument carried thereby. When the arm, therefore, is disposed at any position angularly the standard it supports the instrument for use, and when moved to a position of alinement with the standard it will fall back therein of its own weight or can be easily pushed into the standard out of the way of the spectator.

The arm may be withdrawn and so flexed over the end of the standard that no portion of the supporting arm or instrument is visible to obstruct the view of a spectator sitting in the rear of the spectator using the instrument. The instruments whether in use or at rest are so disposed as not to obstruct in any way the passage of spectators between successive pairs of seats or the rapid exit of people from the theatre in case of emergency. The mechanism is constructed as a unit so that it will be difficult to remove any portion of the same without completely removing the standard from the seat or the cutting of the electric wire.

The electric wire leading from the optical instrument to the feeder wire will not become twisted in use as the arm is prevented from rotating within its supporting standard and the instrument itself is limited as to rotation relative the arm. The arm is completely receivable within the standard when not in use so as to be out of the way and protected from injury.

What I claim is:

1. In a theatre, a plurality of seats arranged in rows, an electrically-operated optical instrument located at each seat, an electrical connection at each seat, a movable support connecting each instrument with its corresponding seat adapted to permit the spectator occupying said seat to freely move the instrument to any position on a direct line with the spectator's eyes, and to support said instrument in such position without assistance from the spectator, a flexible conductor leading from each seat connection to the said optical instrument, said conductor extending through the instrument support and carried and protected thereby.

2. In theatre equipment for the viewing of projected pictures stereoscopically, in combination, an individual electrically driven optical instrument through which pictures may be viewed, a movable support for said instrument, an electric wire leading from said instrument and carried by said support, a housing within which said wire is disposed and means within said housing intermediate the ends of said wire to limit the twisting thereof.

3. In theatre equipment for the viewing of pictures with resulting stereoscopic effect, in combination with an electrically driven optical instrument through which pictures may be viewed, a movable support for said instrument, an electric wire carried by said support and leading to said instrument, a housing within which said wire is disposed, and extensible supporting means about which said wire is coiled to prevent kinking thereof.

4. A support for an electrically driven optical instrument, comprising a stationary hollow standard, a supporting arm for the instrument, said arm receivable within the standard and capable of withdrawal outwardly therefrom, a coil spring within the standard, an electric wire leading to the instrument through the standard and arranged in successive coils about said coil spring.

5. A support for an electrical optical instrument, comprising a hollow standard, a flexible arm to support said instrument, said arm mounted within said standard but capable of being withdrawn outwardly therefrom and disposed at an angle thereto, an electric wire leading through said standard to said instrument, an extensible support for said wire, said wire being arranged in said standard in successive coils about said extensible support to permit extensibility of the wire without twisting thereof.

6. A support for an electrically driven instrument, comprising a hollow standard, a flexible arm mounted within said standard capable to withdraw outwardly therefrom, said electrically driven instrument rotatably secured to the outer end of said arm, a coil spring within said standard secured at one end thereto and at the other end to said arm, an electric wire leading to said instrument through said standard, said wire arranged in said standard in successive coils about said spring.

7. A support for an electrical instrument, comprising a hollow standard, a supporting arm for said instrument, said arm mounted within said standard and having one end secured therein against removal therefrom, said instrument secured to the other end of said arm, said arm receivable within said standard to permit said instrument to rest on the upper end of said standard when not in use but adapted to be withdrawn outwardly therefrom and disposed at any one of a plurality of positions angularly thereto, and an electric connection leading to said instrument through said standard.

8. A support for an electrically driven instrument, comprising a hollow standard, a supporting arm for said instrument mounted within said standard to be withdrawn outwardly therefrom a limited distance, an electric connection leading to said instrument through said standard, said connection arranged in successive coils within said standard below the end of said arm.

9. In combination with a row of theatre chairs and supports for electric optical instruments arranged in proximity said chairs, said supports arranged in pairs positioned a pair at each alternate interval between the chairs of said row, each support comprising a hollow standard, an arm receivable within said standard and extensible outwardly therefrom, an electrically driven instrument mounted upon the outer end of said arm and adapted to seat upon the end of said standard when the arm is withdrawn within the standard, said optical instrument rotatably supported upon said arm, said arm held against rotation within said standard, and an electric connection extending through said standard and arm to said optical instrument.

In testimony whereof, I sign this specification.

LAURENS HAMMOND.